United States Patent

[11] 3,543,791

| [72] | Inventors | Irving Fox<br>70—20 108th St., Forest Hills, 11375,<br>Ralph Labelson, 735 East 101st St.,<br>Brooklyn, New York 11236 |
|---|---|---|
| [21] | Appl. No. | 722,330 |
| [22] | Filed | April 18, 1968 |
| [45] | Patented | Dec. 1, 1970 |

[54] MIXING CHAMBER AND SHUTOFF VALVE FOR CONTROLLING VISCOUS FLUIDS
6 Claims, 7 Drawing Figs.

[52] U.S. Cl. ................................................ 137/599,
137/604; 251/5, 251/7
[51] Int. Cl. .................................................. F16k 19/00
[50] Field of Search ............................................ 137/599,
604; 222/145; 239/370, 432, 505; 251/7

[56] References Cited
UNITED STATES PATENTS
| 1,481,535 | 1/1924 | Burdett ........................ | 137/604X |
| 2,548,641 | 4/1951 | Whipple ...................... | 137/604 |
| 2,674,263 | 4/1954 | Rupp et al. .................. | 137/604 |
| 2,786,608 | 3/1957 | Brown ......................... | 251/7X |
| 3,250,130 | 5/1966 | Lozano ........................ | 251/7X |

FOREIGN PATENTS
| 643,763 | 9/1950 | Great Britain ............... | 137/604 |

Primary Examiner—Robert G. Nilson
Attorneys—Albert C. Johnston, Robert E. Isner, Alvin Sinderbrand and Lewis H. Eslinger ABSTRACT: A mixing chamber and shutoff valve for a dispenser in which a heavy viscous fluid such as chocolate syrup is combined with a nonviscous fluid such as carbonated water by passing the viscous and nonviscous fluids through intersecting paths in the mixing chamber and thence through a foraminous member and the shutoff valve stops the flow of the viscous material without coming in direct contact with it.

INVENTORS
IRVING FOX
RALPH LABELSON
BY Lewis H. Eslinger
ATTORNEY 3,543,791

MIXING CHAMBER AND SHUTOFF VALVE FOR CONTROLLING VISCOUS FLUIDS

BACKGROUND OF THE INVENTION

It is conventional to dispense fluids such as carbonated beverages from dispensing machines. Generally a flavored liquid is placed in the dispenser and carbonated water is also placed in the dispenser. The operator of the dispenser chooses a desired flavor and by means of known valving arrangements a flavored drink is dispensed from a nozzle. Separate dispensers were formerly utilized for each flavor and then the art progressed to the stage where a multiplicity of flavored liquids could be placed in a single dispensing unit and a chosen flavor selectively dispensed.

A favorite drink of the consuming public is the chocolate flavored variety. The chocolate syrup which is used to make the drink is generally a heavy, viscous fluid and has very poor flow. It is very difficult to mix chocolate syrup with other fluids, and this is especially pronounced at low temperatures. Another serious drawback of chocolate syrup is that it tends to clog the valve syrup which serve to control the flow of the syrup. The prior art dispensers used a powdered chocolate which was mixed with water; however, the true rich flavor of chocolate such as is obtainable only when chocolate syrup is used was missing. The powdered chocolate mixed with water had a low viscosity compared with the true chocolate syrup. Chocolate syrup has a relatively high viscosity and is extremely difficult to dispense because it tends to clog small openings and valves.

SUMMARY OF THE INVENTION

This invention is directed to a valve for use with substances especially of the viscous type which when in contact with valve mechanisms deleteriously affect the mechanism by either corroding or clogging it. The invention also has another very important aspect in that it provides a foraminous structure which functions in conjunction with a mixing chamber to break up and aerate a viscous or gelatinous mass so that the mass which is ordinarily resistant to flow will have greatly increased flow characteristics and is readily miscible with other fluids.

The structure comprising the invention is housed in a conventional dispenser housing having a nozzle and actuating mechanism thereon. A container within the housing having a viscous substance therein such as chocolate syrup is pumped through a syrup supply line into a mixing chamber. The syrup supply line passes through a valve housing in which the valve functions to shut off the flow of syrup to the mixing chamber. The valve mechanism is exteriorly mounted with respect to the syrup supply line and is thereby not contaminated by the viscous substance. The valve bears on the exposed outer surface of the supply line which is flexible and crimps the line to shut off the supply of syrup. When the valve is in the actuated open position the syrup is pumped to the mixing chamber where it is met in a turbulent area by a relatively nonviscous material such as carbonated water, commonly known as "-seltzer.". The seltzer is fed to the mixing chamber under relatively high pressure so as to break up the viscous syrup into smaller globules of less viscous material in which the viscous and nonviscous fluids are intermixed. The mass of seltzer and chocolate is then forcefully fed through a foraminous member in which the globules are forced through a plurality of small apertures in order to aerate and break up the viscous mass still further and fully mix the seltzer with the viscous material so as to form a uniform mixture of flavored viscous substance and carbonated water.

It is an object of this invention to provide an improved dispenser whereby viscous substances can be readily combined with nonviscous substances.

It is another object of this invention to provide a valve for use with viscous substances whereby the valve is not exposed to the deleterious effects of the viscous substance.

It is a further object of this invention to provide a foraminous member combined with a mixing chamber in a dispenser for viscous substances whereby the viscous substance is broken up and mixed with another substance.

It is an additional object of this invention to utilize a pressurized fluid to comminute a viscous substance into relatively small globules.

Further objects and advantages of the present invention will become apparent as the following description proceeds, and the features of novelty which characterize the invention will be pointed out with particularity in the claims annexed to and forming a part of this specification.

BRIEF DESCRIPTION OF THE DRAWINGS

FIG. 3 is a perspective view showing the mixing chamber;

FIG. 4 is an exploded view showing the mixing chamber, a foraminous member and dispensing nozzle prior to assembly;

FIG. 5 is a partial sectional view taken on line 5–5 of FIG. 2;

FIG. 6 is a sectional view taken on line 6–6 of FIG. 2 showing a valve in unactuated position; and FIG. 7 is a sectional view showing the valve in actuated position.

DESCRIPTION OF THE PREFERRED EMBODIMENT

Figure 1:
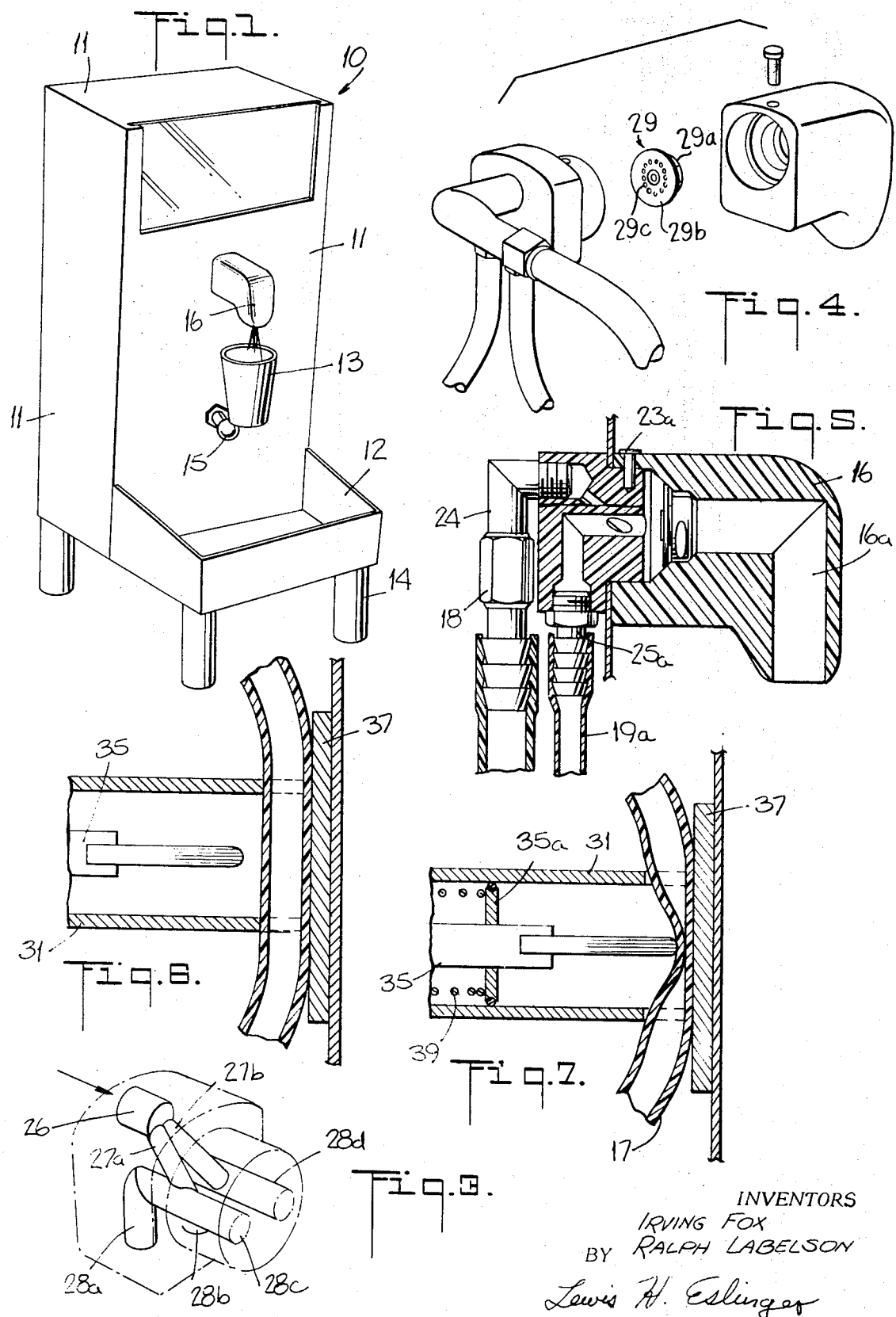
FIG. 1 is a perspective view of a beverage dispenser.
Figure 2:
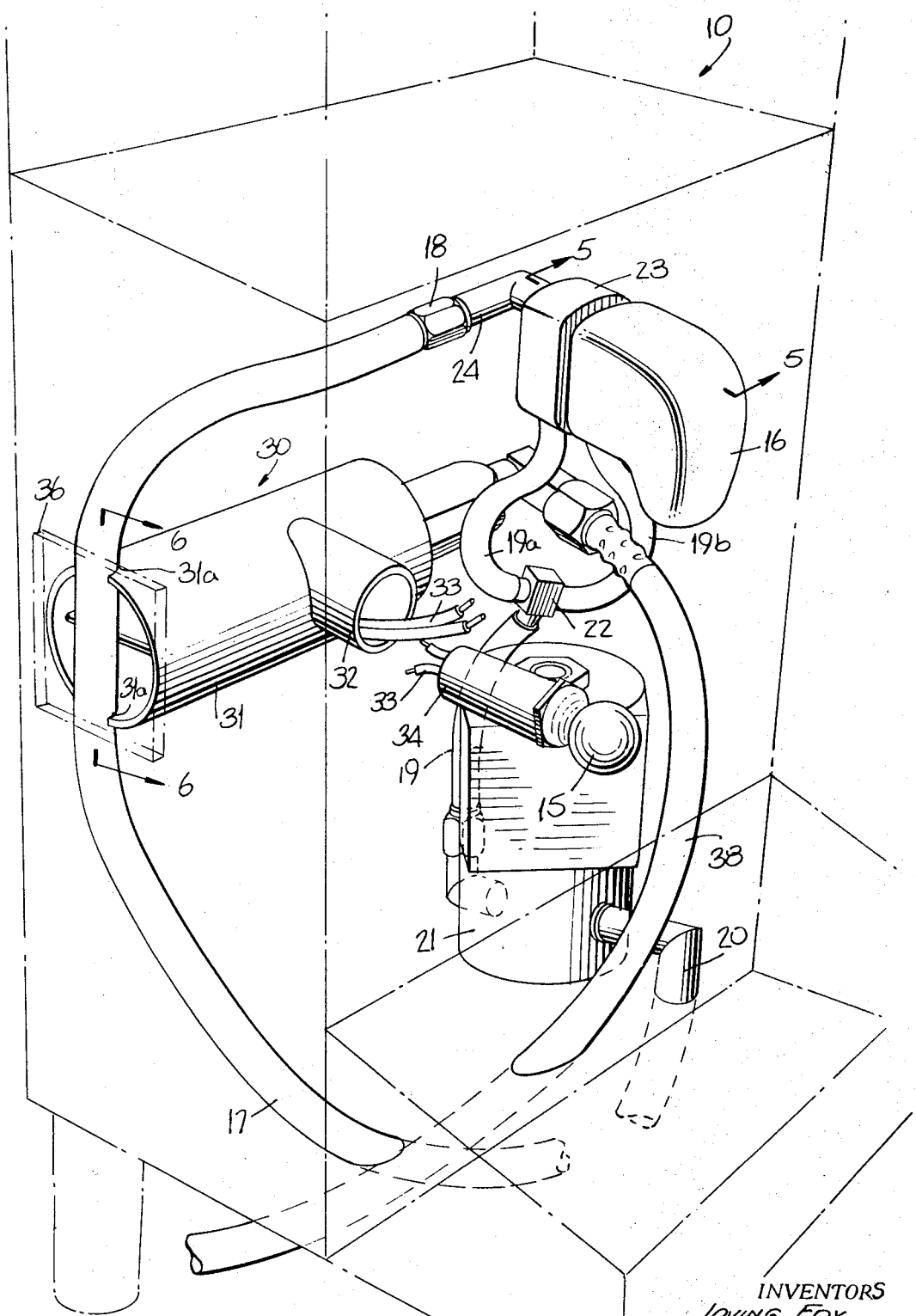
FIG. 2 is a perspective view showing the elements of the invention mounted within the beverage dispenser.

Referring now to FIG. 1, there is shown a beverage dispenser which is designated generally by the numeral 10. The dispenser 10 can be of any desired shape and design and is herein shown to be comprised of walls 11 forming a housing. The dispenser 10 can include a tray 12 for catching dispensed substances which spill from the receptacle 13 which receives the dispensed substances. The dispenser 10 can be supported in any known manner such as by legs 14. A switch in the form of a control knob 15 is conveniently placed on the dispenser 10 to actuate the dispensing system in a known manner. A nozzle 16 on the dispenser 10 provides an opening to receive substances dispensed from the dispenser 10. It should be understood that the dispenser 10 is merely illustrative of a single embodiment of the invention and my invention is readily adaptable to known beverage dispensers. The dispenser 10 can also be of the type wherein a multiplicity of substances can be selectively dispensed depending on the substance chosen by the user.

The beverages to be dispensed can be located in suitable containers (not shown) either within or externally of the dispenser 10. The beverages can be under pressure in the containers or can be pumped through the dispenser 10 utilizing a separate pump (not shown). In the present invention a viscous substance such as chocolate syrup is located in a pressurized container within the dispenser or externally thereof. The viscosity of chocolate syrup at 25° C. is in the range of 6,000 centipoises as taken with a Brookfield viscosimeter model LVF spindle No. 3, speed 12.

The syrup supply line 17 leads from the pressurized container or pump to the nozzle 16. The syrup line 17 is a flexible hose which can be rubber, plastic or any other flexible material having an outside diameter in the order of one-quarter inch. Suitable fittings 18 are used to firmly attach the supply line to the inlet and exhaust openings of the dispensing system.

Carbonated water for the system is supplied through the seltzer supply line 19. The seltzer is supplied under pressure to the dispensing system. The seltzer supply line 19 is preferably of the same diameter and material as the syrup supply line 17. The seltzer can be made by passing water through a water supply line 20 into a carbonation chamber 21 which mixes water and carbon dioxide in a known manner to form carbonated water or seltzer. The seltzer leaves the carbonation chamber 21 via seltzer supply line 19 and thence into a T-fitting 22 where the seltzer supply line is divided into two lines 19a and 19b of approximately ½-inch diameter each and thence into the dispensing nozzle 16.

The syrup supply line 17 and the seltzer supply line 19 both feed into a mixing chamber 23 which is essentially a metal or plastic housing having passages bored therein. The mixing chamber 23 is attached to the nozzle 16 in any known manner such as a press fit wherein a pin 23a, which extends through the nozzle 16 into the chamber 23, maintains the chamber 23 and nozzle 16 connected. The mixing chamber 23 has an elbow 24 fixed thereto to which the syrup line 17 is attached by d. the fitting 18. Fittings 25a and 25b are provided on the underside of the mixing chamber 23 for the reception of the seltzer supply lines 19a and 19b respectively. Referring to FIG. 3, it will be seen that a number of passageways have been bored in the mixing chamber block. The main inlet passageway 26 receives syrup from the syrup supply line 17. The inlet passageway 26 branches into two interconnecting passageways 27a and 27b which feed into the exhaust passageways 28c and 28d The syrup supply passageways 27a and 27b join the seltzer supply passageways 28a and 28b respectively which are bored in the mixing chamber block 23 forming a mixing area in which there is created an area of high turbulence where the seltzer and syrup feed into each other. The high turbulence in the confined area caused at this junction causes the syrup to break into relatively small globules and become intermixed with the seltzer. The action taking place in the area of turbulence is analogous to one violently shaking a mixture of chocolate syrup and seltzer in a container so as to mix the two substances together except that it takes place in a small area. It is the mixing and stirring effect at this juncture which blends the seltzer and syrup together and forms globules of the substance. The mixture is then forced through the exhaust passageways 28c and 28d by the pressurized system.

The nozzle 16 has an opening 16a bored therein through which the substance to be dispensed flows. A foraminous member 29 which can be stamped or formed in an other known manner and can be metal, plastic or any other material is clamped between the discharge nozzle 16 and the mixing chamber 23. The member 29 is formed of a hollow body 29a which is open at its rearward end and a disklike face member 29b having a multiplicity of apertures 29c formed therein. The disk 29 can have a series of of holes 29c placed randomly or circumferentially around a central opening in the disk 29. The holes can be in the order of one thirty-sixth of an inch in diameter or any other size which permits passage of the globules through the screen with resistance, however, without clogging. For example, I have found that placing a ring of twelve 1/16-inch diameter holes, spaced an equal distance apart along a circumference which is radially spaced from the center of the disk a distance of three-sixteenth inches will provide the desired results. It is to be understood, however, that the arrangement of the holes and their sizes is a matter of choice. The holes 29c are each smaller than either of the exhaust passageways 28c or 28d of the mixing chamber 23. The hollow body member can be glued, soldered or otherwise attached to the disk 29c. The discharge nozzle 16 is counterbored to receive the screen 29 and is retained by the pressure of a press fit. The globules of syrup mixed with seltzer are forced through the foraminous screen 29 where the larger globules are further broken down and mixed seltzer. The resulting mass is a perfect mixture of seltzer and syrup. The screen 29 also functions to aerate the mass which imparts a light texture to the emitted substance. 8

Since viscous substances, such as syrups tend to clog mechanical structures having moving parts, the invention herein disclosed further utilizes a shutoff valve which is not subject to the deleterious effects of the syrup. The shutoff valve is denoted generally by the numeral 30. The shutoff valve is located within the housing 31 which can be any convenient shape and material. The conduit 32 is a hollow enclosure leading into the housing 31 for current carrying wires 33. The conduit 32 is closed by the cylindrical hex head closure member 34 having an opening on the bottom thereof for the reception wires. The current carrying wires lead to a 110 volt a.c. source. The actuating mechanism 15 can function as a switch to initiate current to the valve mechanism 30 and to the pump (not shown) which forces liquids through the system. Since the switch mechanism forms no part of the present invention, further detail is not deemed necessary. Suffice it to say that any known suitable switch can be used.

The valve mechanism comprises a plunger 35 mounted within a coil-wound core (not shown). Thus when a current flows through the coil, which occurs when the knob 15 is actuated, the plunger 35 will move to the position shown in FIG. 6. In the FIG. 7 position, the plunger 35 is in the closed position. To maintain the plunger in closed position shown in FIG. 7 a compression spring 39 or hydraulic force can bear against the sealed flange 35a on the plunger 35. The hydraulic pressure obtained by water, gas or air fed through the hydraulic line 38 is fed to the interior of the housing 31 behind the sealed flange 35a which maintains the plunger in the FIG. 7 position. When the knob 15 is actuated, the hydraulic pressure is released by any known release mechanism. The syrup line 17 is frictionally held in the end of the housing 31 which has portions 31a thereof cut out to receive the syrup supply line 17. The housing 31 can have a flange 36 thereon which enables the housing to be bolted to the frame 37 of the dispenser. The supply line 17 bears against the frame thereby precluding movement of the supply line out of the cutout position portions 31a. When the plunger 35 of the solenoid is actuated by spring or hydraulic forces it forcefully bears on the supply line 17 so as to prevent the flow of syrup through the line 17. Thus, no part of the valve is in contact with the syrup in the line 17.

In operation, the user actuates the control knob 15 which closes the electrical circuit to the solenoid and withdraws the plunger against the bias of a compression spring. If a hydraulic valve is used, the actuation of the knob 15 relieves the hydraulic pressure on the plunger in any known manner. The viscous syrup is then pumped or otherwise forced through the syrup line 17 into the mixing chamber 23. Simultaneously therewith, a nonviscous fluid is forced into the mixing chamber and the viscous and nonviscous substances intermix to form globules. The globular mixture, being under pressure, is forced through a foraminous screen 29 wherein the globules are further broken down and aerated and the beverage, such as a chocolate drink, is dispensed.

Although an illustrative embodiment of this invention has been described in detail herein with reference to the accompanying drawings, it is to be understood that the invention is not limited to that precise embodiment, and that various changes and modifications may be made therein by one skilled in the art without departing from the scope or spirit of the invention.

We claim:

1. A device for combining a viscous and a nonviscous substance for use in a beverage dispenser comprising:
   a mixing chamber housing having a first inlet passage therein adapted to be connected to a source of pressurized viscous fluid, said first inlet passage terminating in a plurality of branched outlet portions;
   said mixing chamber housing having a plurality of second inlet passages therein adapted to be connected to a source of pressurized nonviscous fluid; and
   said mixing chamber housing having a plurality of exhaust passages leading from said second inlet passages to the exterior of said mixing chamber, said plurality of branched outlet portions interconnecting with said exhaust passages intermediate the ends of the latter, said viscous fluid and said nonviscous fluid intermixing at each interconnection of an outlet portion of said first inlet passage with the respective exhaust passage, a high-turbulence mixing area being formed at each of said interconnections in which said viscous fluid and said nonviscous fluid intermix to form a mixture of globules of viscous fluid and of nonviscous fluid due to said turbulence, the pressurized fluids forcing the mixture of globules through said exhaust passages, and means for combining said mixtures of globules issuing from said exhaust passages into a common globular mixture capable of being dispensed without further mixing.

2. A device for mixing a viscous and a nonviscous substance as defined in claim 1 in which, said means for combining the mixtures of globules comprises:

a nozzle having a dispensing channel therethrough and being removably attached to said mixing chamber housing; and a member having a multiplicity of apertures which are smaller than the diameter of each of the exhaust passages and which is interposed between said mixing chamber and said nozzle to break up the mixtures of globules from the plurality of exhaust passages into a finer globular mixture as it passes through the apertures thereby thoroughly mixing and aerating the fluids, said finer globular mixture being said common globular mixture, said common globular mixture being capable of passing through said dispensing channel without further mixing.

3. An apparatus for use with a dispenser as defined in claim 2 in which said member comprises:

a cup-shaped portion having an opening therethrough; and a foraminous disk fixed to one side of said cup-shaped portion whereby said globular mixture passing through said disk member is finely mixed.

4. A device for mixing a viscous and a nonviscous substance as defined in claim 1 further comprising a valve means for controlling the flow of said viscous fluid while avoiding direct contact with said viscous fluid whereby said valve means is not affected by the viscosity of said viscous fluid, said valve means comprising a housing having means thereon for supporting a flexible supply tube interconnected between said source of pressurized viscous fluid and said first inlet passage, a plunger reciprocably mounted in said housing in juxtaposition with said tube, means urging said plunger forcefully against said supply tube so as to crimp said supply tube and preclude the passage of said viscous fluid to said mixing chamber when said globular mixtures are not being formed, and means for removing the force crimping the supply tube during the formation of said globular mixtures.

5. A device for controlling the flow of a fluid as defined in claim 4 in which the means urging the plunger against the supply tube comprises a spring.

6. A device for controlling the flow of a fluid as defined in claim 4 in which a flange is fixed to said plunger and is in sealing relationship with the housing whereby the plunger is urged against the supply tube by hydraulic pressure.